United States Patent [19]
Ito

[11] Patent Number: 5,418,889
[45] Date of Patent: May 23, 1995

[54] SYSTEM FOR GENERATING KNOWLEDGE BASE IN WHICH SETS OF COMMON CAUSAL RELATION KNOWLEDGE ARE GENERATED

[75] Inventor: Tatsuo Ito, Yokohama, Japan

[73] Assignee: Ricoh Company, Ltd., Tokyo, Japan

[21] Appl. No.: 984,043

[22] Filed: Dec. 1, 1992

[30] Foreign Application Priority Data

Dec. 2, 1991 [JP] Japan ................... 3-347932

[51] Int. Cl.⁶ ............................................. G06F 15/18
[52] U.S. Cl. ........................................ 395/75; 395/50; 395/54
[58] Field of Search .................... 395/916, 75, 11, 12, 395/10, 50, 54, 575, 54

[56] References Cited

U.S. PATENT DOCUMENTS

| | | | |
|---|---|---|---|
| 4,884,217 | 11/1989 | Skeirik et al. | 395/12 |
| 5,001,714 | 3/1991 | Stark et al. | 395/916 |
| 5,014,220 | 5/1991 | McMann et al. | 395/50 |
| 5,021,992 | 6/1991 | Kondo | 395/54 |
| 5,067,099 | 11/1991 | McCown et al. | 395/916 |
| 5,107,499 | 4/1992 | Lirov et al. | 395/911 |

OTHER PUBLICATIONS

Real-Time expert system for diagnostics and closed-loop control, A.-H. Jones et al., 5-7 Sep. 1990.

Expert Systems for Condition Monitoring, Fault Diagnosis and Control, C. M. Ready, 18 Oct. 1991.

*Primary Examiner*—Allen R. MacDonald
*Assistant Examiner*—Richemond Dorvil
*Attorney, Agent, or Firm*—Cooper & Dunham

[57] ABSTRACT

A knowledge base generating system includes a knowledge base having a first knowledge base containing sets of causal relation knowledge describing cause-effect relations of events taking place within a target machine, and having a second knowledge base containing sets of membership knowledge describing a structure of members of the target machine, each event of the cause-effect relations having data to identify one of the members, so that the first and second knowledge bases have mutually retrievable data, a retrieval part for retrieving a number of first members in the second knowledge base, which members correspond to similar causal relation knowledge sets within the first knowledge base, a detection part for detecting whether or not there is a high-rank member in the second knowledge base, the high-rank member corresponding to each of the first members on the basis of the membership knowledge of the second knowledge base, and a commonizing part for generating a common causal relation knowledge set, corresponding to the high-rank member, in the first knowledge base, when the high-rank member is detected.

12 Claims, 19 Drawing Sheets

FIG.22

R1 — CAUSE OF HDD FAULT IS DEFECTIVE SYSTEM FILE

R2 — CAUSE OF HDD FAULT IS DEFECTIVE INTERNAL CURRENT

R3 — CAUSE OF DEFECTIVE INTERNAL CURRENT IS TRANSFORM PROCESS FAULT

R4 — CAUSE OF TRANSFORM PROCESS FAULT IS PSU FAULT

R5 — CAUSE OF HDD FAULT IS PROBABLY PSU FAULT

SYSTEM FOR GENERATING KNOWLEDGE BASE IN WHICH SETS OF COMMON CAUSAL RELATION KNOWLEDGE ARE GENERATED

BACKGROUND OF THE INVENTION

The present invention relates to a knowledge base generating system for generating a knowledge base in which different model bases have mutually retrievable data, which knowledge base is applied to knowledge based expert systems such as a fault diagnostic system or a computer-aided design support system.

In a knowledge based expert system such as a fault diagnostic system or a computer-aided design support system, it is desirable that much expert knowledge be stored in a knowledge base in a well-arranged manner. FIG.1 shows a conventional knowledge base 50 provided in a fault diagnostic system for diagnosing faults in a target machine. In this knowledge base 50, a number of different sets of knowledge N1, N2, . . . , Nn concerning causal relations between causes and effects are generated as shown in FIG. 1, and there may be many sets of knowledge having similar causal relations in the knowledge base 50. Especially when the target machine is a large-scale, computer-aided system, component parts of the same type are combined to construct the units of the system, and some faults take place in the system in a similar manner. It should be noted that a number of different sets of knowledge concerning similar causal relations exist in the knowledge base 50.

In the case of the above mentioned knowledge base 50, however, there is a problem in that the knowledge concerning similar causal relations is repeatedly input and generated. For example, when the knowledge base 50 contains one set of knowledge N1 as shown in FIG. 2A, another set of knowledge N2 is input and generated in the knowledge base 50 as shown in FIG. 2B. When it is necessary to generate a further set of knowledge N3 concerning causal relation similar to that of the knowledge N1, data is again input so that the knowledge N3 which is separate from the other sets of knowledge is generated in the knowledge base 50 as shown in FIG. 2C, although the causal relation of the knowledge N3 is similar to that of the knowledge N1. In this manner, by inputting the data for each set of the knowledge concerning similar causal relations, the knowledge base 50 containing several sets of knowledge N1 through Nn shown in FIG. 1 is built.

Therefore, in order to generate the conventional knowledge base 50, it is necessary that sets of knowledge concerning similar causal relations be generated by repeatedly inputting data for each set of knowledge. When it is necessary that many sets of knowledge concerning similar causal relations be generated in the knowledge base 50, much time and labor are required to input the data for each set of knowledge. This is inconvenient for the users. Also, it is possible that a set of necessary knowledge might be omitted from the knowledge base if an operator fails to input the set of knowledge by mistake.

SUMMARY OF THE INVENTION

Accordingly, it is a general object of the present invention to provide a novel and useful knowledge base generating system in which the above described problems are eliminated.

Another, more specific object of the present invention is to provide a knowledge base generating system in which the time and labor required for inputting data can be remarkably reduced and the omitting of any of the necessary knowledge from the knowledge base can be prevented.

The above mentioned objects of the present invention can be achieved by a knowledge base generating system which includes a knowledge base having a first knowledge base containing sets of causal relation knowledge describing cause-effect relations of events taking place within a target machine, and having a second knowledge base containing sets of membership knowledge describing a hierarchical structure of members of the target machine, each event in each cause-effect relation, contained in the first knowledge base, having data to identify one of the members of the target machine, so that the first and second knowledge bases have mutually retrievable data, a retrieval part for retrieving a number of first members in the second knowledge base, which members correspond to similar causal relation knowledge sets within the first knowledge base, a detection part for detecting whether or not there is a high-rank member in the second knowledge base, the high-rank member corresponding to each of the first members retrieved by the retrieval part on the basis of the membership knowledge of the second knowledge base, and a commonizing part for generating a common causal relation knowledge set, corresponding to the high-rank member of the second knowledge base, in the first knowledge base, when the high-rank member is detected by the detection part, the common causal relation knowledge set describing a set of events within the target machine linked by a causal relation. According to the present invention, it is possible to automatically generate the common causal relation knowledge in the knowledge base, thereby reducing the data inputting time and labor. Also, it is possible to prevent the omitting of necessary knowledge from the knowledge base.

Other objects and further features of the present invention will become apparent from the following detailed description when read in conjunction with the accompanying drawings.

BRIEF DESCRIPTION OF THE DRAWINGS

FIG. 22 is a diagram for explaining the generalization of causal relations performed to generate the knowledge base.

DESCRIPTION OF THE PREFERRED EMBODIMENTS

Figure 1:
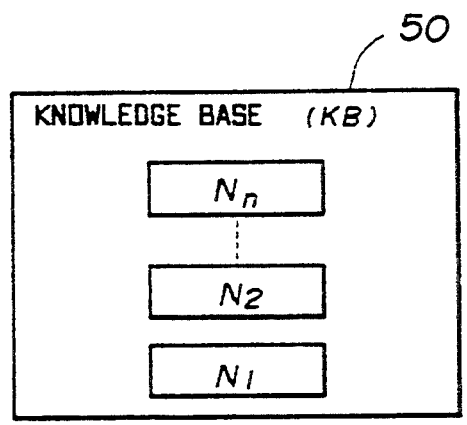
FIG.1 is a diagram showing a structure of a conventional knowledge base.
Figure 2A:
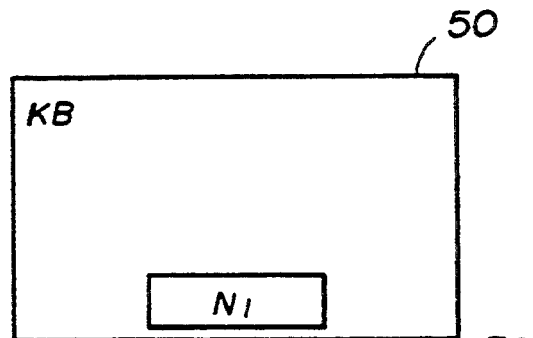
FIGS. 2A through 2C are diagrams for explaining a process for generating the conventional knowledge base shown in FIG. 1.
Figure 2B:
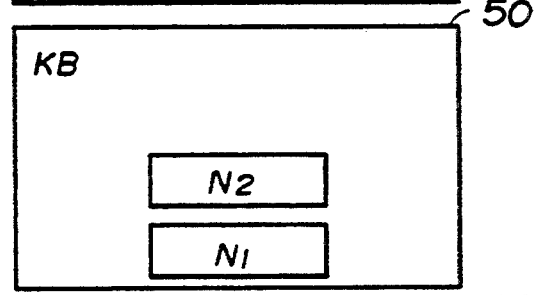
Figure 2C:
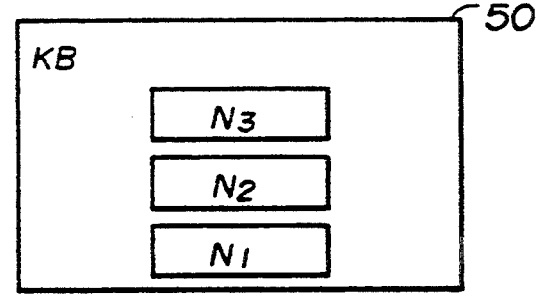
Figure 3:
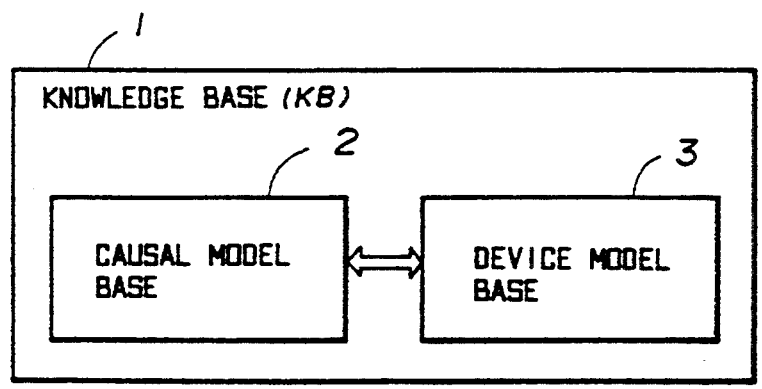
FIG. 3 is a diagram showing an embodiment of a knowledge base generated according to the present invention.

A description will now be given of a knowledge base generated according to the present invention. FIG. 3 shows an embodiment of a knowledge base which has been generated according to the present invention. The knowledge base generating system of the invention which is applied to a fault diagnostic system for diagnosing faults in a target machine will be described. In FIG. 3, there is shown a knowledge base 1 having a causal model base 2 and a device model base 3. The causal model base 2 has sets of causal relation knowledge describing cause-effect relations of fault events in the target machine. The device model base 3 has sets of device knowledge describing the hierarchy of devices of the target machine.

Figure 4:
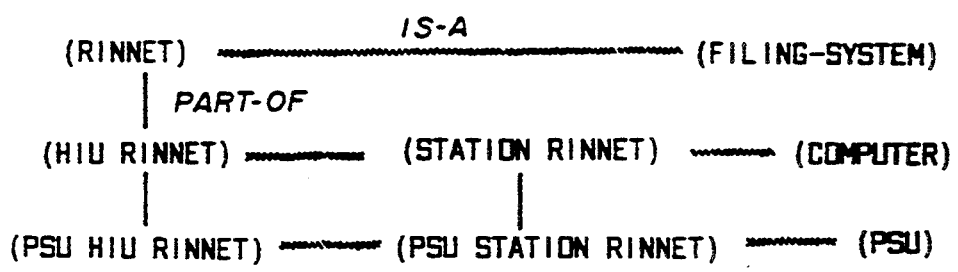
FIG. 4 is a diagram showing a structure of device knowledge in a device model base of the knowledge base generated according to the present invention.

FIG. 4 shows a representation of the device structure of the target machine described by the device knowledge of the device model base 3. The device structure defined by the device knowledge, as shown in FIG. 4, has a hierarchical form in which device names in parentheses are linked by two types of relations: one is called a PART-OF relation (or, component-to-device relation) which is indicated by a vertical line in FIG. 4, and the other is called an IS-A relation (or, concreteness-to-abstraction relation) which is indicated by a horizontal line in FIG. 4. In the example of FIG. 4, the hierarchical relation between a low-rank device and high-rank device is the IS-A relation, while the PART-OF relation indicates that a component is part of a device.

Figure 5:
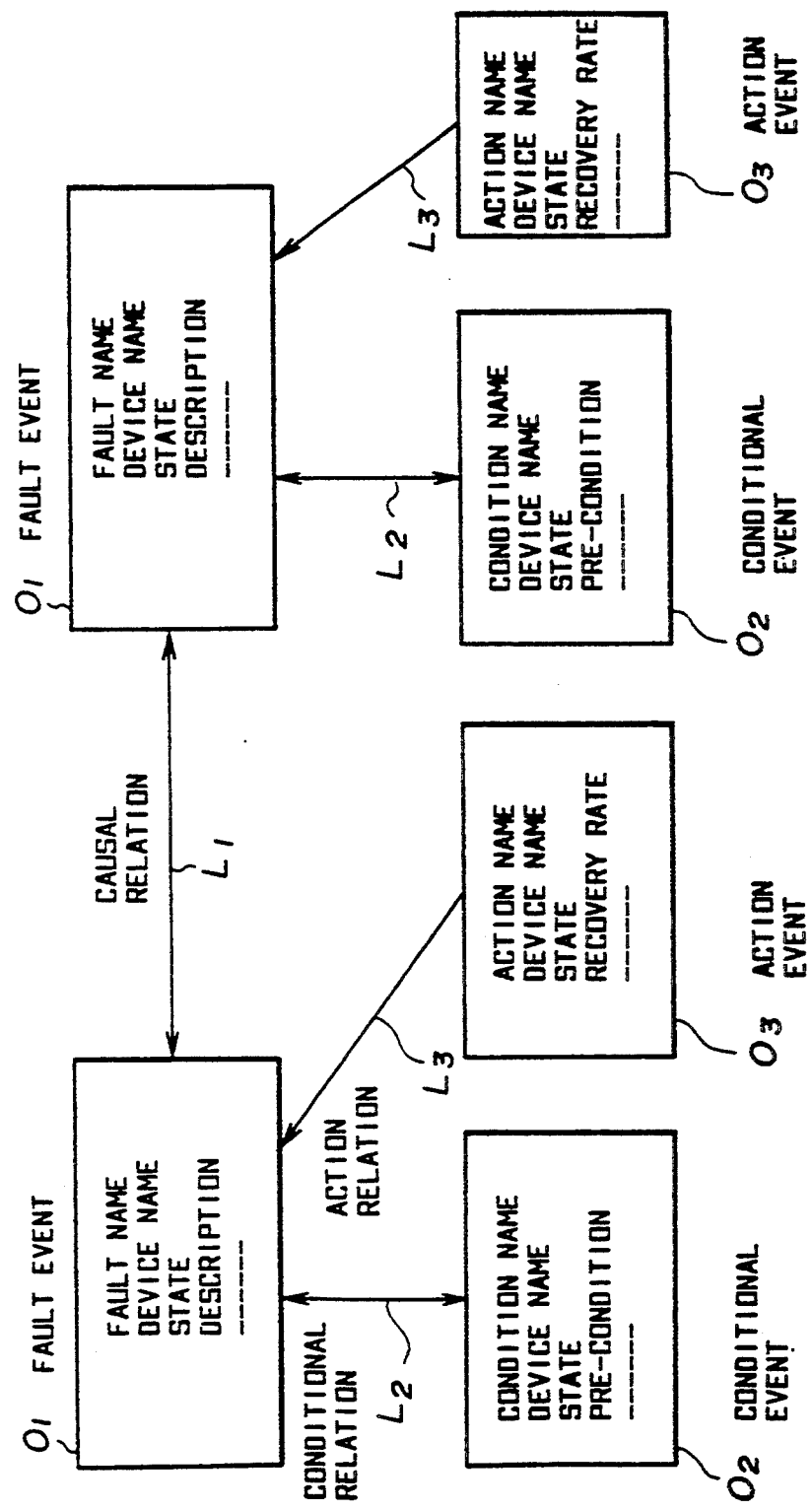
FIG. 5 is a diagram showing a structure of causal relation knowledge in a causal model base of the knowledge base according to the present invention.

FIG. 5 shows a structure of causal relation knowledge contained in the causal model base 2. In the causal model base 2 shown in FIG. 5, each set of causal relation knowledge contains a set of event objects which are linked by a cause-effect relation. There are three types of objects in the causal model base 2: fault event objects O1, condition event objects O2, and action event objects O3. Each set of fault event objects O1 is linked by a causal relation L1. Each set of fault event object O1 and condition event object O2 is linked by a conditional relation L2. Each set of fault event object O1 and action event object O3 is linked by an action relation L3.

Each set of objects contained in the causal model base 2 has attributes with specific attribute values. For example, each of the sets of the fault event objects O1 has a set of attributes, a fault name, a device name, a state of the fault, a description of the fault, etc., and each of these attributes has a specific attribute value.

Figure 6:
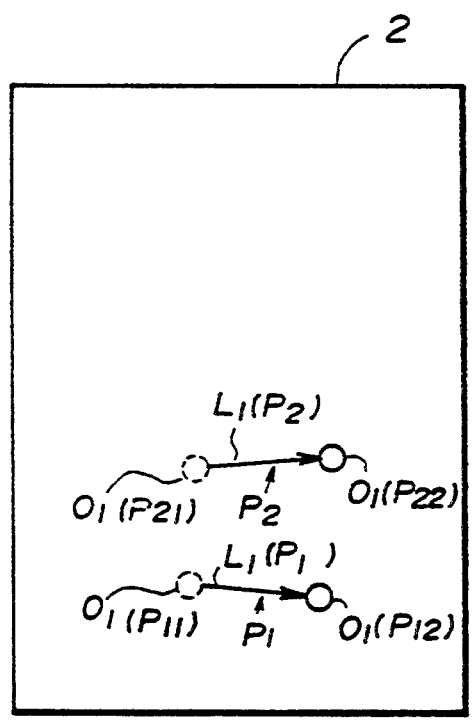
FIG. 6 is a diagram showing a structure of the causal model base shown in FIG. 5.

FIG. 6 shows a structure of the causal model base 2. In the causal model base 2, as shown in FIG. 6, each set of the fault event objects O1 linked by a causal relation L1 is stored as the causal relation knowledge sets Pk (k=1, 2, . . . ). More specifically, a causal relation knowledge set P1 defining a set of fault event objects O1 (cause event object O1(P11) and effect event object O1(P12)) linked by a causal relation L1(P1), and another causal relation knowledge set P2 defining another set of fault event objects O1 (or objects O1(P21) and O1(P22)) linked by another causal relation L1(P2), are stored in the causal model base 2.

Each of the fault events of the causal relation knowledge in the causal model base 2 has attributes of a device in which the fault take place. The name of the device, for example, is a mutually retrievable data contained in the causal relation knowledge of the causal model base 2 and in the device knowledge of the device model base 3. As described above, any of the fault event .objects O1 in the causal model base 2 has a specific device name as the value of the attribute of the device, by using the device name of the fault event object as the index for retrieving the device model base 3, it is possible to identify the device knowledge contained in the device model base 3. Conversely, it is also possible to retrieve the causal relation knowledge in the causal model base 2 from the device model base 3 so that data related to the fault in the device can be retrieved in the device model base 3.

In the knowledge base 1 shown in FIG. 3, expert knowledge is stored respectively in the causal model base 2 and in the device model base 3, and it is possible to easily manipulate or edit the knowledge in each of the bases 2 and 3.

In the knowledge base 1 shown in FIG. 3, the causal relation knowledge sets defining the fault event objects linked by the causal relations, necessary to diagnose the target machine, are connected to the respective fault events, not the causal relations, and the fault diagnostic knowledge can be easily classified into a large number of sets of knowledge. Also, it is possible to easily select the index for retrieving the knowledge of one model base from the other model base, or vice versa.

Figure 9:
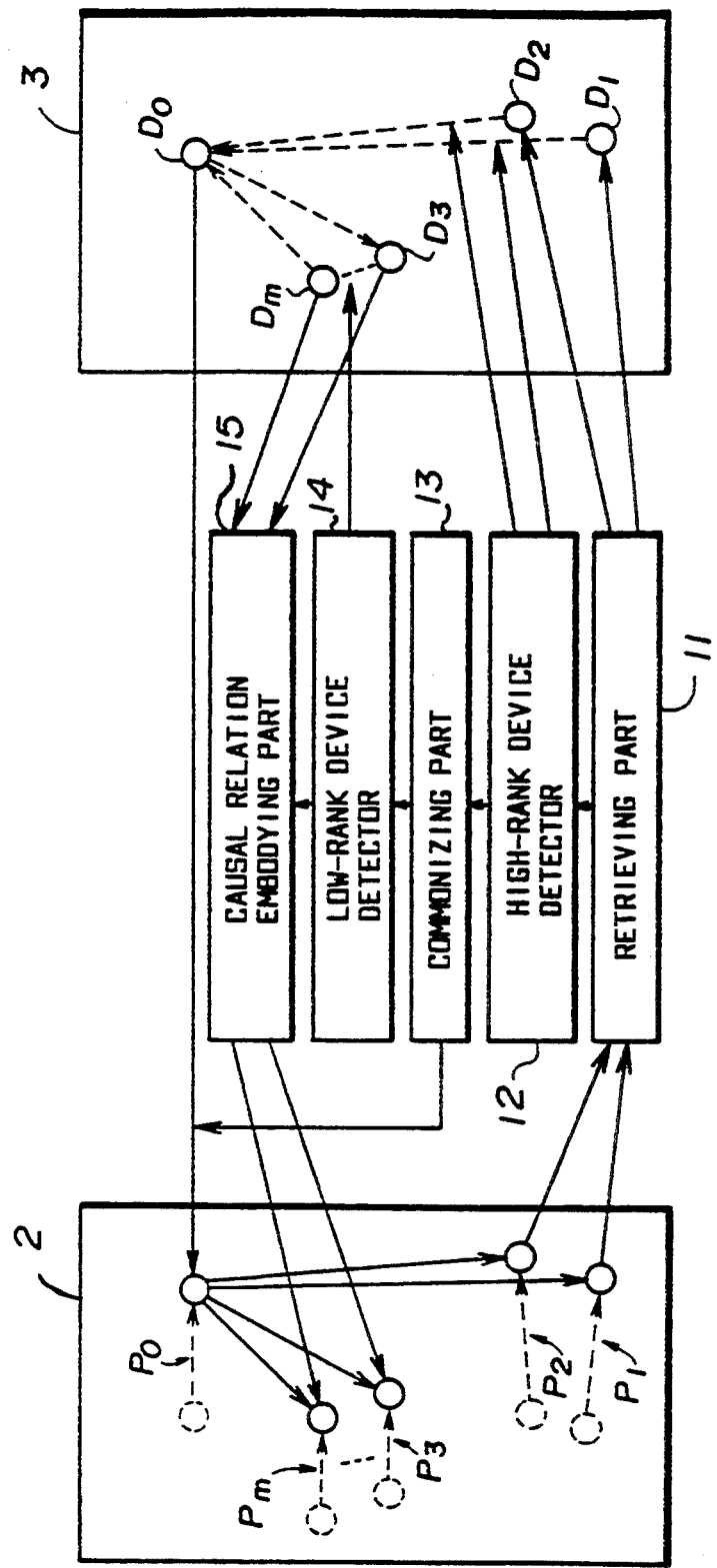
FIG. 9 is a block diagram showing a first embodiment of the knowledge base generating system according to the present invention.

FIG. 9 shows a first embodiment of the knowledge base generating system according to the present invention. In the first embodiment shown in FIG. 9, it is intended to automatically generate a set of common causal relation knowledge in the causal model base 2 by using the device knowledge in the device model base 3. This function of the knowledge base generating system is called a commonization.

Figure 7:
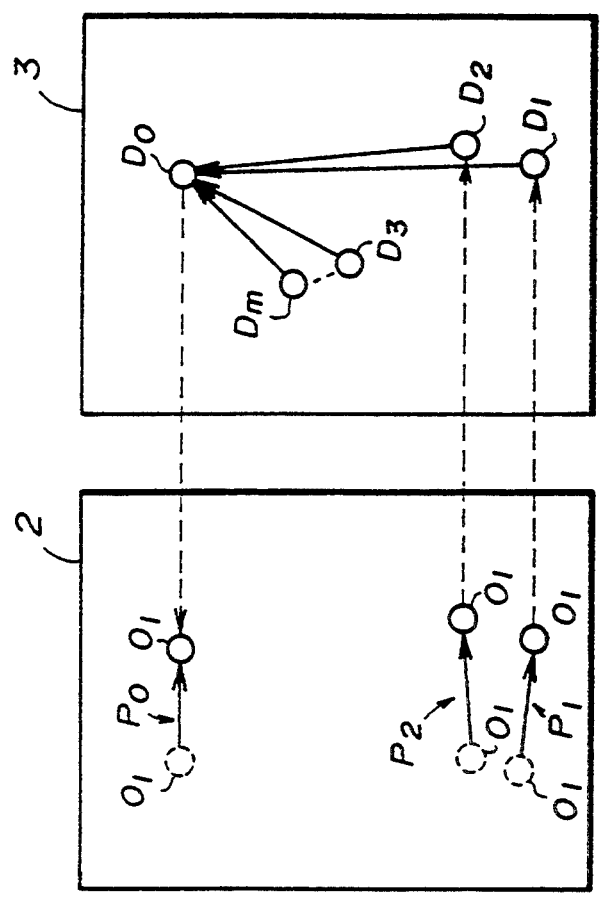
FIG. 7 is a diagram for explaining commonization performed by a knowledge base generating system according to the present invention.

FIG. 7 shows the commonization which is performed to generate the knowledge base 1 shown in FIG. 3 according to the present invention. This commonization is performed when the causal relations described by the causal relation knowledge sets P1 and P2 are similar or closely related to each other, and when the devices D1 and D2, corresponding to the knowledge sets P1 and P2 of the causal model base 2, have a common, high-rank device D0 in the device model base 3 as shown in FIG. 7. In the commonization, first, the devices D1 and D2, corresponding to the causal relation knowledge sets P1 and P2 of the causal model base 2, are detected in the device model base 3, and the high-rank device D0 of the devices D1 and D2 is detected in the device model base 3 on the basis of the hierarchical structure of devices in the device model base 3. Next, a common causal relation knowledge set P0, corresponding to the detected high-rank device D0 of the device model base 3, is generated in the causal model base 2. This common causal relation knowledge set P0 describes a set of fault event objects O1 linked by a causal relation.

In the first embodiment shown in FIG. 9, it is also intended to generate other sets of causal relation knowledge P3 through Pm in the causal model base 2 by using the common causal relation knowledge set P0 described above and the device knowledge of the device model base 3. The causal relation knowledge sets P3-Pm correspond to low-rank devices dependent on the high-rank device D0 of the device model base 3. This function of the knowledge base generating system is called an embodying.

Figure 8:
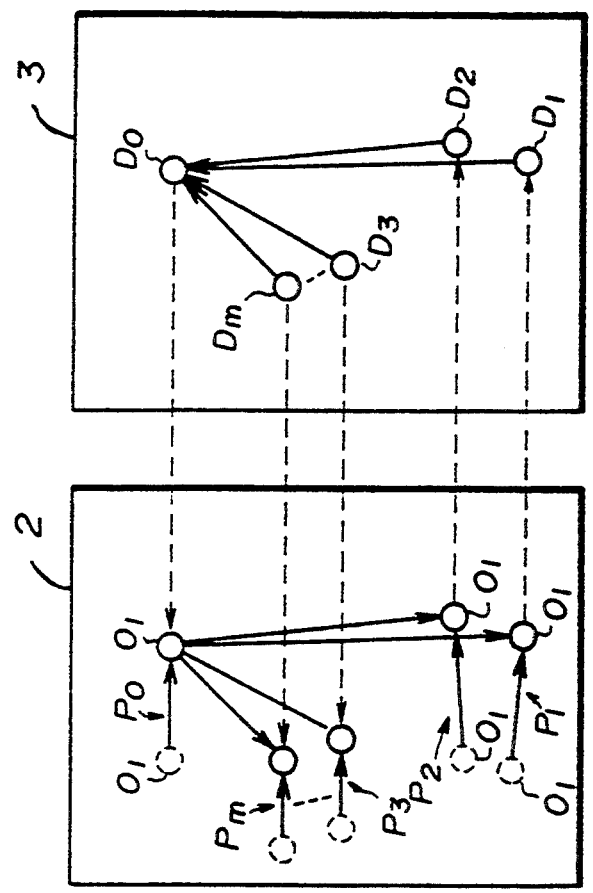
FIG. 8 is a diagram for explaining embodying performed by the knowledge base generating system according to the present invention.

FIG. 8 shows the embodying of causal relation knowledge in order to generate the knowledge base 1 shown in FIG. 3. This embodying is performed in a case where the device model base 3 has one or more low-rank devices D3 through Dm which are dependent on the high-rank device D0 and different from the devices D1 and D2 corresponding to the causal relation knowledge sets P1 and P2 of the causal model base 2, as shown in FIG. 8. In this embodying, the low-rank devices D3 through Dm dependent on the high-rank device D0 are detected in the device model base 3. Then, the causal relation knowledge sets P3 through Pm corresponding to the low-rank devices D3 through Dm of the device model base 3 are generated or embodied in the causal model base 2. The knowledge sets P3 through Pm generated are different from the knowledge sets P1 and P2.

As shown in FIG. 9, the first embodiment of the knowledge base generating system includes a retrieving part 11, a high-rank device detector 12, a commonizing part 13, a low-rank device detector 14, and an embodying part 15. The retrieving part 11 retrieves the devices D1 and D2, corresponding to the similar causal relation knowledge sets P1 and P2 of the causal model base 2, in the device model base 3. The high-rank device detector 12 detects whether or not the high-rank device D0, common to the retrieved devices D1 and D2 of the device model base 3, is in the device model base 3 on the basis of the device knowledge thereof. When the high-rank device D0 is detected, the commonizing part 13 generates the common causal relation knowledge set P0, corresponding to the high-rank device D0 of the device model base 3, in the causal model base 2, and this common causal relation knowledge set P0 describes a set of fault event objects O1 linked by a causal relation.

The low-rank device detector 14 detects whether or not there are any low-rank devices D3 through Dm in the device knowledge of the device model base 3, which devices are dependent on the high-rank device D0 and different from the devices D1 and D2 of the device model base 3. When the low-rank devices D3 through Dm are detected, the embodying part 14 generates the causal relation knowledge sets P3 through Pm in the causal model base 2, these knowledge sets P3 through Pm corresponding to the low-rank devices D3 through Dm of the device model base 3 and differing from the causal relation knowledge sets P1 and P2.

The commonizing part 13 generates the common causal relation knowledge set P0 in the causal model base 2 by copying or duplicating the cause and effect fault event data and relations to fault events of the common causal relation knowledge set. The embodying part 15 generates the causal relation knowledge sets P3 through Pm in the causal model base 2 by copying or duplicating the cause and effect fault event data and relations of the common causal relation knowledge set P0 to those of the causal relation knowledge sets P3 through Pm in the causal model base 2.

Next, a description will be given, with reference to FIG. 10, of a theoretical aspect of the knowledge base. Before the operation performed by the knowledge base generating system of the present invention is described, four definitions of sets of fault event knowledge and sets of device knowledge in the knowledge base will be given.

Figure 10:
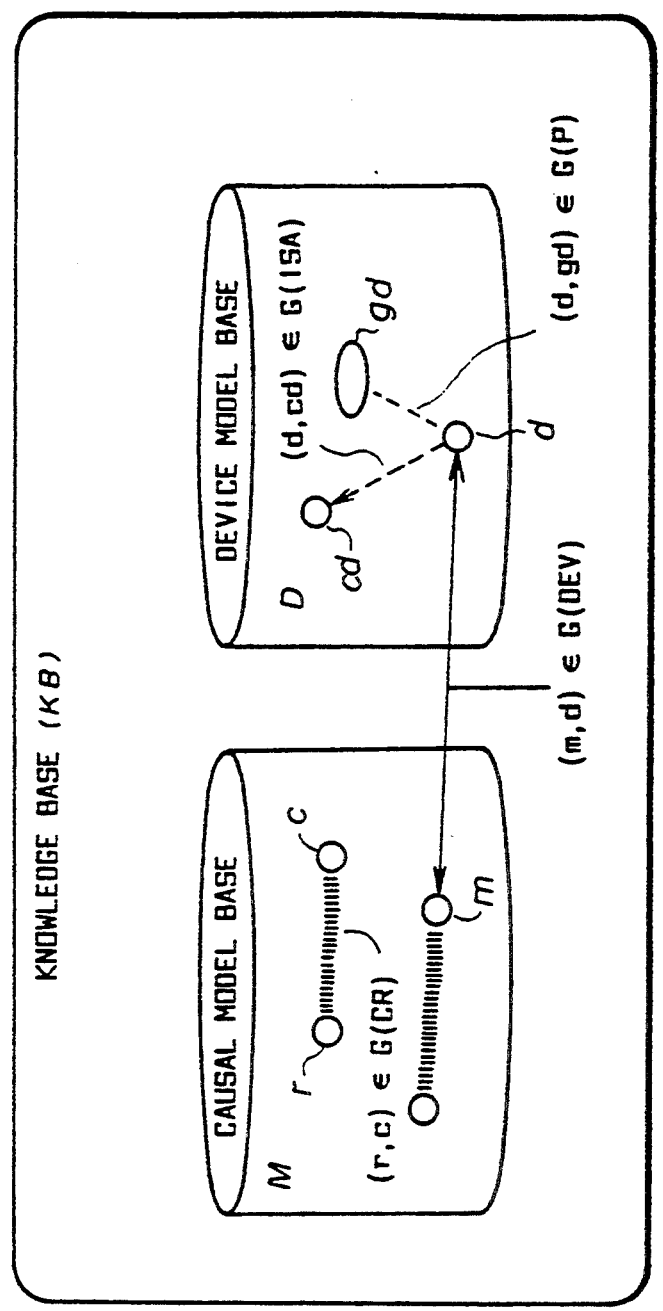
FIG. 10 is a diagram for explaining a theoretical structure of the knowledge base according to the present invention.

In the knowledge base shown in FIG. 10, KB denotes a whole set of the knowledge base, M denotes a set of fault events of the target machine, D denotes a set of devices of the target machine, and ED denotes a set of element devices of the target machine. The element device set ED is a partial set of the device set D.

1. Definition of G(CR): a partial set of M×M, is as follows.

$$G(CR)=[(x,y)|x,y \in M, xCRy] \quad (1)$$

In this definition, xCRy indicates that, in the fault event set M, fault events x and y have a cause-effect relation CR wherein x is the effect and y is the cause. For example, fault events r and c of the fault event set M (the causal model base) have this cause-effect relation, as shown in FIG. 10. 2. Definition of G(DEV): a partial set of M×D, is as follows.

$$G(DEV)=[(x,y)|x \in y \in D, xDEVy] \quad (2)$$

In this definition, xDEVy indicates that, in the whole set KB, a fault event x and a device y have a fault-device relation DEV wherein the fault takes place in the device y. For example, a fault event m of the fault event set M and a device d of the device set D have this fault-device relation as shown in FIG. 10.

3. Definition of G(ISA): a partial set of D×D, is as follows.

$$G(ISA) = [(x,y) | x,y \in D, xISAy] \quad (3)$$

In this definition, xISAy indicates that devices x and y have an IS-A relation wherein x is a low-rank device and y is a high-rank device in the set D. For example, devices d and cd of the device set D have this IS-A relation as shown in FIG. 10.

4. Definition of G(P): a partial set of D×D is $$G(P) = [(x, y) | x,y \in D, xPy] \quad (4)$$

In this definition, xPy indicates that devices x and y have a PART-OF relation wherein x is an element device which is part of the device y in the set D. For example, devices d and gd of the device set D have this PART-OF relation as shown in FIG.10.

Figure 11:
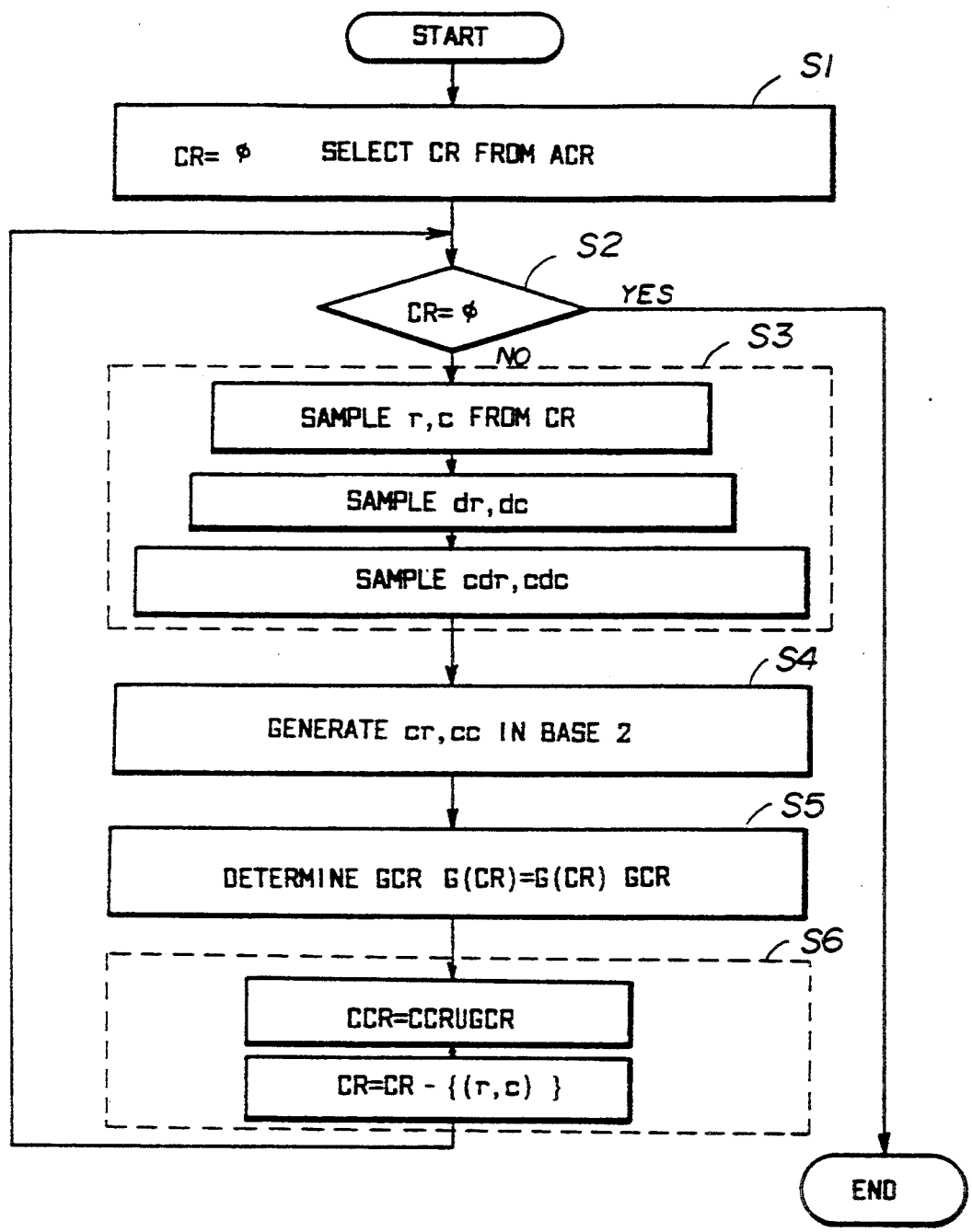
FIG. 11 is a flow chart for explaining the commonization performed by the knowledge base generating system shown in FIG. 9.

Next, the commonization performed to generate common causal relation knowledge sets in the causal model base 2 using the device model base 3 will be described with reference to the flow chart shown in FIG. 11.

In step S1 of the flow chart of FIG. 11, a target causal relation set CR including target causal relations in the causal model base 2 is selected from all causal relation sets ACR for the target machine, as follows.

$$CCR: \text{Common Casual Relation set} = \phi \quad (5)$$

$$CR \subseteq ACR = [(r, c) | \quad (r, dr) \in G(DEV),$$
$$(c, dc) \in G(DEV),$$
$$(r, c) \in G(CR), dr \quad D, dc \quad D]$$

In step S2, it is detected whether or not the causal relation set CR is vacant. In other words, step S2 detects whether or not there are any elements in the set CR. When the set CR is not vacant, step S3 performs sampling of high-rank devices (cdr, cdc) in accordance with the following formula.

$$[cdr, cdc | \quad (dr, cdr) \in G(ISA), \quad (6)$$
$$(dc, cdc) \in G(ISA),$$
$$(r, dr) \in G(DEV),$$
$$(c, dc) \in G(DEV)]$$

where $(r, c) \in CR$

In this step S3, fault events r and c (r: effect, c: cause) from the set CR (the causal model base 2) are sampled, devices dr and dc from the device model base 3, corresponding to the fault events r and c of the causal model base 2, are sampled, and high-rank devices cdr and cdc from the device model base 3 are sampled by making use of the device knowledge with respect to the devices dr and dc.

In step S4, common fault events cr and cc corresponding to the high-rank devices cdr and cdc are generated in the causal model base 2 as in the following formula.

$$M = M \cup [cr, cc] \quad (7)$$
$$G(DEV) = G(DEV) \cup [(cr, cdr), (cc, cdc)]$$

where the attributes of the common fault events cr and cc are different from the device attributes of the fault events r and c.

In step S5, a cause-effect relation GCR between the common fault events cr and cc is determined as follows.

$$GCR = [(cr, cc) | \quad (cr, cdr) \in G(DEV), \quad (8)$$
$$(cc, cdc) \in G(DEV)]$$

$$G(CR) = G(CR) \cup GCR$$

After the relation GCR between the common fault events cr and cc is determined, the fault events (r, c) are removed from the set CR in step S6, as follows.

$$CCR = CCR \cup GCR \quad (9)$$
$$CR = CR - [(r, c)]$$

Then, the procedure is returned back to step S2, and the above steps S2 through S6 are repeated until the target causal relation set CR is vacant. When step S2 detects that the target causal relation set CR is vacant, all the common causal relation sets have been generated in the causal model base 2, and thus the commonization procedure shown in FIG. 11 is finished.

After the commonization procedure is finished, the embodying part 15 generates causal relation knowledge sets in the causal model base 2, the causal relation knowledge sets corresponding to the low-rank devices D3 through Dm dependent on the high-rank device D0.

Figure 12:
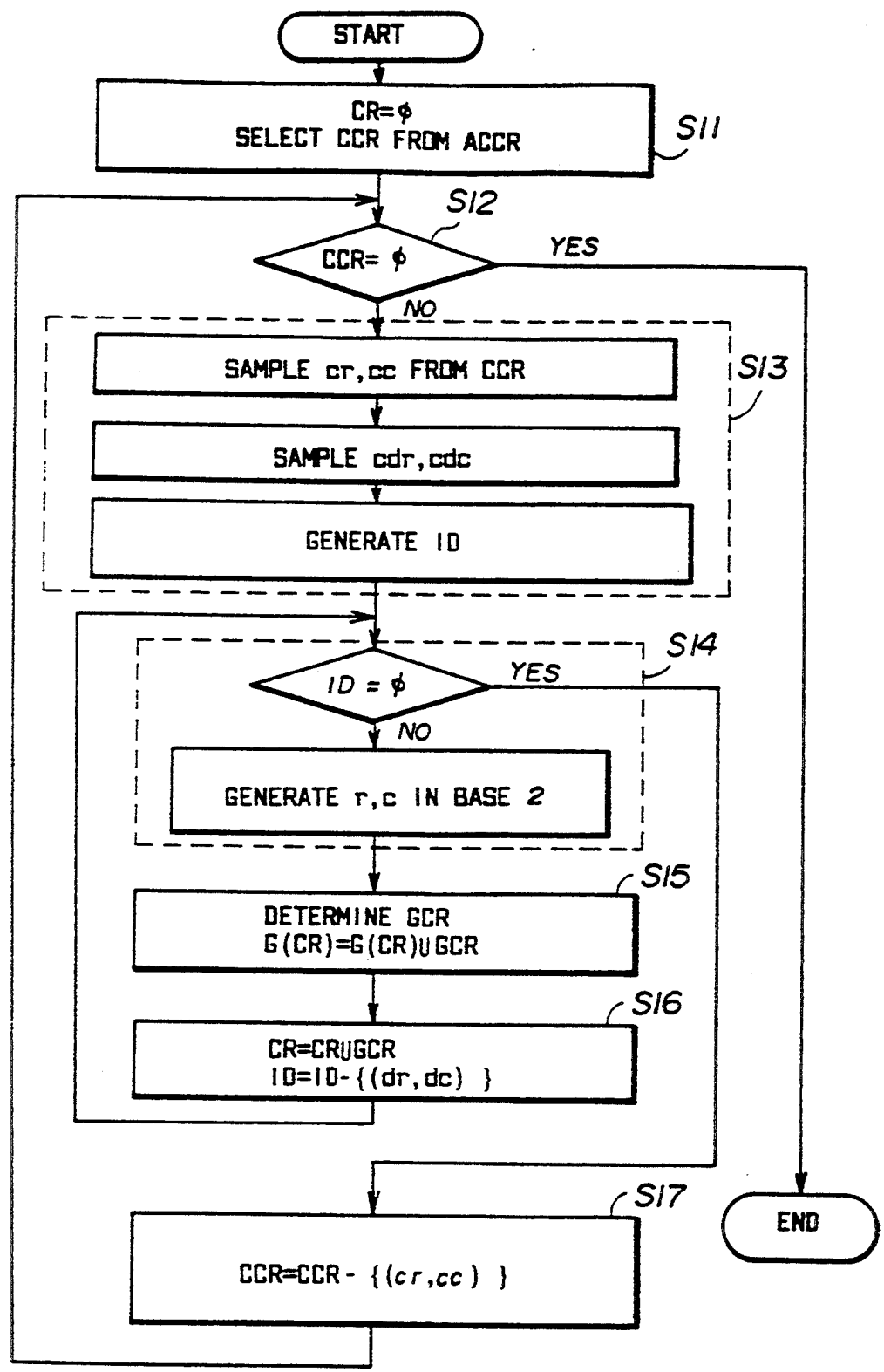
FIG. 12 is a flow chart for explaining the embodying performed by the knowledge base generating system shown in FIG. 9.

Next, the embodying performed by the knowledge base generating apparatus of the present invention will be described with reference to FIG. 12.

In step S11 shown in FIG. 12, causal relation sets CCR which are to be embodied are selected from all common causal relation sets ACCR of the causal model base 2 as follows. The common causal relations sets are generated in the causal model base 2 through the commonization.

$$CR \text{ (Generated Casual Relation) set} = \phi \quad (10)$$
$$CCR \subseteq ACCR$$
ACCR (All Common Casual Relation) sets for
the target machine = $[(cr, cc) | \quad (cr, cc) \in G(CR),$
$(cr, cdr) \in G(DEV),$
$(cc, cdc) \in G(DEV),$
$(r, c) \in G(CR),$
$(r, dr) \in G(DEV),$
$(c, dc) \in G(DEV),$
$(dr, cdc) \in G(ISA),$
$(dc, cdc) \in G(ISA)]$ In step S12, it is detected whether or not the target causal relation sets CCR, selected in step S11, are vacant. In other words, step S12 detects whether or not there are any elements in each of the sets CCR. When the sets CCR are not vacant, step S13 generates a dependent device set ID (dr, dc) from the sampled elements of the sets CCR, as follows.

$$ID \text{ (dependent device set)} = [(dr, dc) | \quad (cr, cdr) \in G(DEV), \quad (11)$$
$(cc, cdc) \in G(DEV),$
$(dr, cdr) \in G(ISA),$
$(dc, cdc) \in G(ISA),$
$(dr, x) \in G(P),$
$(dc, c) \in G(P)]$ -continued where $(cr, cc) \in CCR$ As in the above formula (11), the elements (cr, cc) of each common causal relation set CCR are sampled, and the high-rank device set (cdr, cdc) corresponding to the elements (cr, cc) (or the common fault events) is sampled, and thus the low-rank device set ID which is dependent on the high-rank device set (cdr, cdc) is generated.

In step S14, it is detected whether or not the low-rank device set ID is vacant. If there is no element in the low-rank device set ID, step S17 is performed. If there are any elements in the device set ID, fault events cr, cc corresponding to the low-rank device are set in the causal model base 2 in step S14, as follows.

$$M = M \cup [r, c]$$
$$G(GEV) = G(DEV) \cup [(r, dr), (c, dc)] \quad (12)$$
$$\text{where } (dr, dc) \in ID$$

The contents of the fault events r, c are the same as the contents of the common fault events cr, cc. When the same fault event object already exists in the causal model base 2, the previous data of the common fault events cr, cc are not updated. In other words, the generated causal relation knowledge sets, corresponding to the low-rank devices dependent on the high-rank device, are different from the previous causal relation knowledge sets of the causal model base 2.

Next, step S15 determines a newly generated causal relation GCR between the fault events r and c, as follows.

$$GCR = [(r, c) | \quad (r, dr) \in G(DEV), \quad (13)$$
$$(c, dc) \in G(DEV),$$
$$(dr, dc) \in ID]$$
$$G(CR) = G(CR) \cup GCR$$

After the causal relation GCR between the fault events r and c is determined, step S16 removes the low-rank devices (dr, dc) from the device set ID, as follows.

$$CR = CR \cup GCR \quad (14)$$
$$ID = ID - [(dr, dc)]$$

The procedure is then returned back to step S14. The steps S14–S16 are repeated until the device set ID becomes vacant.

When step S14 detects that the dependent device set ID is vacant, step S17 removes the common fault events (cr, cc) from each common causal relation set CCR, as follows.

$$CCR = CCR - [(cr, cc)] \quad (15)$$

The procedure is then returned back to step S12 again. The steps S12–S17 are repeated until the common causal relation sets CCR become vacant in step S12. When the CCR become vacant, all the cause-effect relations are generated in the causal model base 2, and then embodying procedure ends.

Thus, the common causal relation knowledge sets can be automatically generated in the knowledge base, thereby reducing the time and labor required for inputting data, and the omitting of necessary knowledge from the knowledge base can be prevented.

In the first embodiment described above, the cause-effect relations of fault events are generated in accordance with the device structure, but no consideration is given the fact that a certain restraint of the devices must be satisfied when one cause-effect relation in the knowledge base is considered. For this reason, in the first embodiment, there is a problem in that the cause-effect relations can be correctly applied only when the target machine has the same device structure as that of the existing device model base. Also, in the above described first embodiment, there is a problem in that no cause-effect relations of fault events relevant to processes which are performed in the target machine are generated.

In order to resolve the above mentioned problems, in the second embodiment of the knowledge base generating system of the present invention, the generalization of cause-effect relations is performed by taking into consideration restraints of the devices and processes of the target machine which must be satisfied when one cause-effect relation is considered. Also, in the second embodiment, by taking into consideration the restraints of devices and processes of the target machine, an embodying procedure similar to that of the first embodiment is performed.

Figure 13:
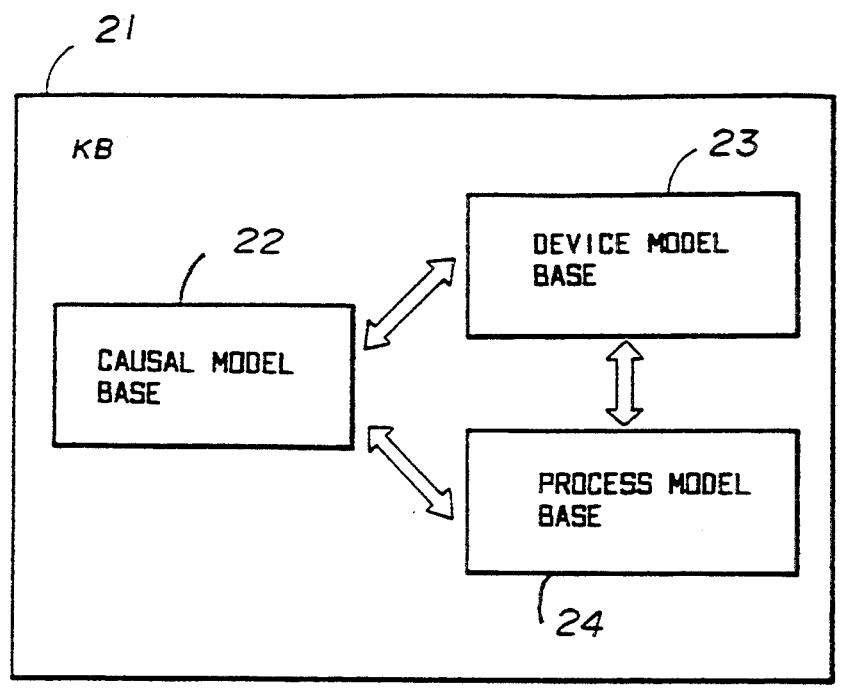
FIG. 13 is a diagram showing a second embodiment of the knowledge base according to the present invention.

FIG. 13 shows a second embodiment of the knowledge base generated according to the present invention. In FIG. 13, there is shown a knowledge base 21 containing a causal model base 22, a device model base 23, and a process model base 24. The causal model base 22 has sets of causal relation knowledge describing cause-effect relations of fault events in the target machine. The device model base 23 has sets of device knowledge describing the device structure of the target machine relevant to the cause-effect fault event relations. The process model base 24 has sets of process knowledge describing the process structure of the target machine relevant to the cause-effect fault event relations.

In the knowledge base 21 shown in FIG. 13, each set of causal relation knowledge describes the cause fault event and the effect fault event, as in the first embodiment. Each fault event is related to a member of the target machine. According to the present invention, the term "member" refers to not only the device knowledge but also the process knowledge. In the second embodiment of the knowledge base generating system, it is intended to resolve the above mentioned problems of the first embodiment.

Figure 14:
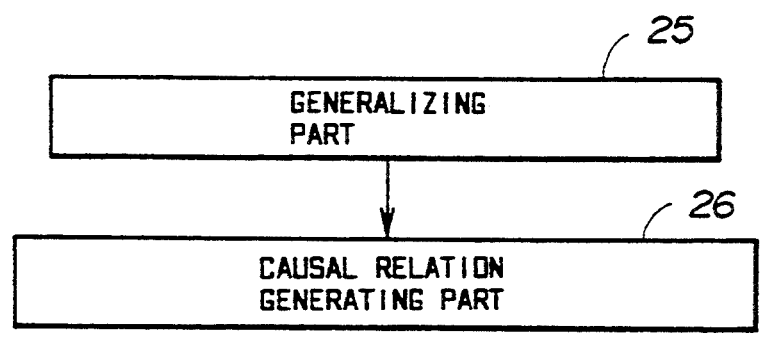
FIG. 14 is a block diagram showing a second embodiment of the knowledge base generating system according to the present invention.

FIG. 14 shows a second embodiment of the knowledge base generating system for generating the knowledge base 21, as shown in FIG. 13. The second embodiment of the knowledge base generating system, as shown in FIG. 14, includes a generalizing part 25 and a causal relation generating part 26.

The generalizing part 25 generates sets of general causal relation knowledge in the knowledge base 21 which are not dependent on specific members of the target machine, by making use of the device knowledge and the process knowledge. The general causal relation knowledge sets generated by the generalizing part 25 can be applied to other machines similar to the target machine. The generalizing part 25 stores the general causal relation knowledge sets in the knowledge base 21. The causal relation generating part 26 generates a set of causal relation knowledge corresponding to a member similar to a corresponding member of the target machine by making use of the general causal relation knowledge sets stored in the knowledge base 21.

Figure 15:
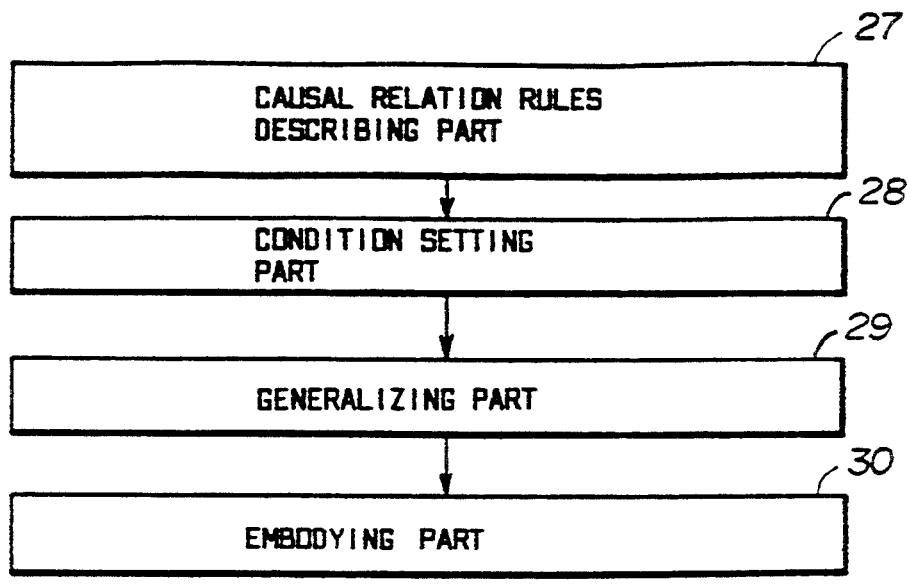
FIG. 15 is a block diagram showing an essential part of the knowledge base generating system shown in FIG. 14.

FIG. 15 shows a more detailed structure of the second embodiment of the knowledge base generating system for generating the knowledge base 21 shown in FIG. 13. The second embodiment of the knowledge base generating system, as shown in FIG. 15, includes a causal relation rules describing part 27, a condition setting part 28, a generalizing part 29, and an embodying part 30.

The causal relation rules describing part 27 presets a number of causal relation rules describing general causal relations of fault events in a general structure including the target machine, in accordance with the knowledge sets contained in the device model base 23 and the process model base 24. The condition setting part 28 sets at least one of the causal relation rules as a restraint which corresponds to a high-rank member of the device model base 23 or the process model base 24.

In accordance with the restraint set by the condition setting part 28, the generalizing part 29 restricts the range of generalization and generates sets of general causal relation knowledge in the knowledge base 21 which are not dependent on specific members, by making use of the device knowledge and the process knowledge. The general causal relation knowledge sets of the generalizing part 29, which are the causal relation rules preset by the part 27, can be applied to other machines similar to the target machine. Only after the restraint is satisfied, does the embodying part 30 then generate causal relation knowledge sets in the causal model base 2, and these knowledge sets corresponding to the low-rank members and differing from the previous causal relation knowledge sets of the knowledge base 21.

In the first embodiment described above, the causal model base 2 contains the sets of causal relation knowledge which are not dependent on specific members of the target machine. Generally, the causal relation knowledge sets should be dependent on specific members of the target machine. In the second embodiment, the causal model base 21 contains the sets of causal relation knowledge, each of which includes a restraint. As described above, in the second embodiment, each member of the target machine is related to not only the device knowledge but also the process knowledge.

The following TABLE shows a set of causal relation rules preset by the causal relation rules describing part 27 of the knowledge base generating system, wherein the causal relation rules are classified in accordance with the membership of the fault events.

TABLE

| CAUSAL RELATION RULES |
| --- |
| A. MEMBERSHIP OF FAULT EVENT IS PROCESS WHICH IS DEPENDENT ON COMPONENT |
| A-1. FAULT OF PART-OF COMPONENT |
| A-2. FAULT OF MATERIAL OF PART-OF COMPONENT |
| A-3. FAULT OF PART-OF PROCESS |
| B. MEMBERSHIP OF FAULT EVENT IS DEVICE WHICH IS DEPENDENT ON COMPONENT |
| B-1. FAULT OF THE DEVICE |
| B-2. FAULT OF RELATED COMPONENT |
| B-3. FAULT OF MATERIAL OF RELATED COMPONENT |
| C. MEMBERSHIP OF FAULT EVENT IS MATERIAL WHICH IS NOT DEPENDENT ON COMPONENT |
| C-1. FAULT OF HAS-PART COMPONENT |
| C-2. FAULT OF HAS-PART PROCESS |

In this TABLE, DEVICE is a general term indicating hardware or software, and is made up of component parts. PROCESS is made up of a set of sub-processes. Each process or sub-process is related to a device, and indicates a sequence of operations when the device is normally operated. MATERIAL serves to link one device to another, and is manipulated by a process. COMPONENT is a part of the device which constitutes the process. HAS-PART COMPONENT indicates a high-rank device having a component part, and PART-OF COMPONENT indicates a low-rank device which is part of another high-rank device. PART-OF PROCESS indicates a low-rank process which is part of another high-rank process. RELATED COMPONENT indicates a PART-OF component or related material.

In the second embodiment of the knowledge base generating system according to the present invention, the generalizing procedure is performed by making use of the restraints of the devices and processes of the target machine. Also, the embodying procedure, similar to that of the first embodiment, is performed by making use of the restraints of the devices and processes of the target machine in the second embodiment.

Figure 16:
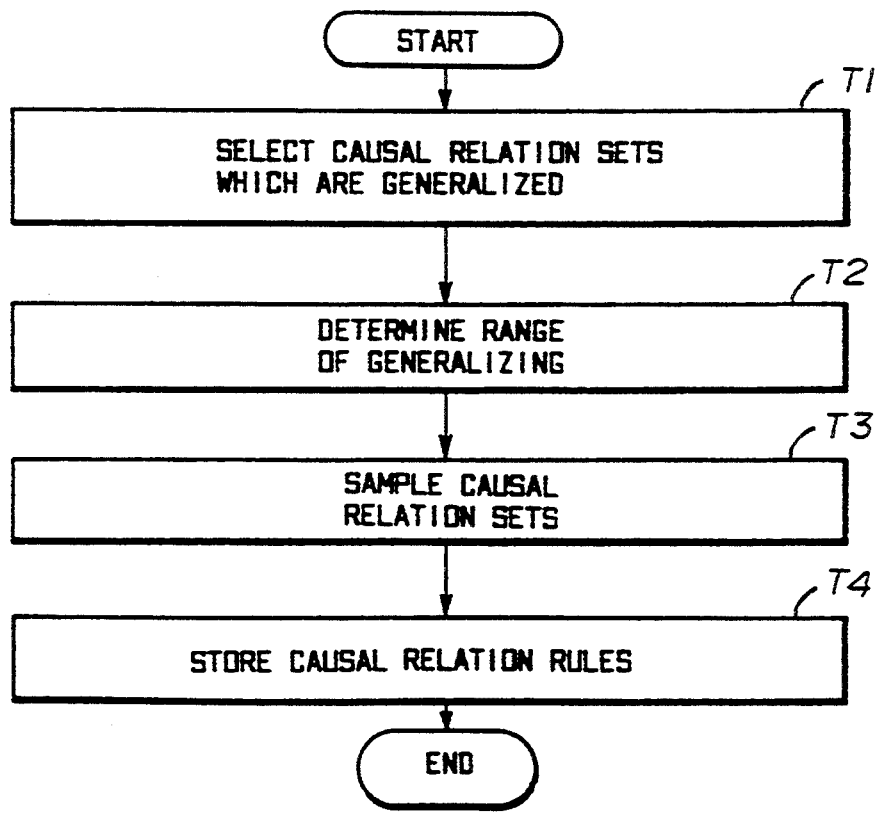
FIG. 16 is a flow chart for explaining generalization performed to generate the knowledge base shown in FIG. 13.

Next, a description will be given of the generalization procedure of the second embodiment with reference to FIG. 16. In step T1 shown in FIG. 16, sets of causal relation knowledge of fault events which are to be generalized are selected. In step T2, the range of the generalization is determined by selecting a high-rank member corresponding to the member of the fault event. In step T3, a set of causal relations are sampled by making use of the membership knowledge of the cause and effect fault events. In step T4, the pertinent causal relation rules, corresponding to the fault events of the high-rank member, are stored in the causal model base 21. If a plurality of sets of causal relations are sampled in step T3, the most suitable one of the causal relation sets is sampled.

Figure 17:
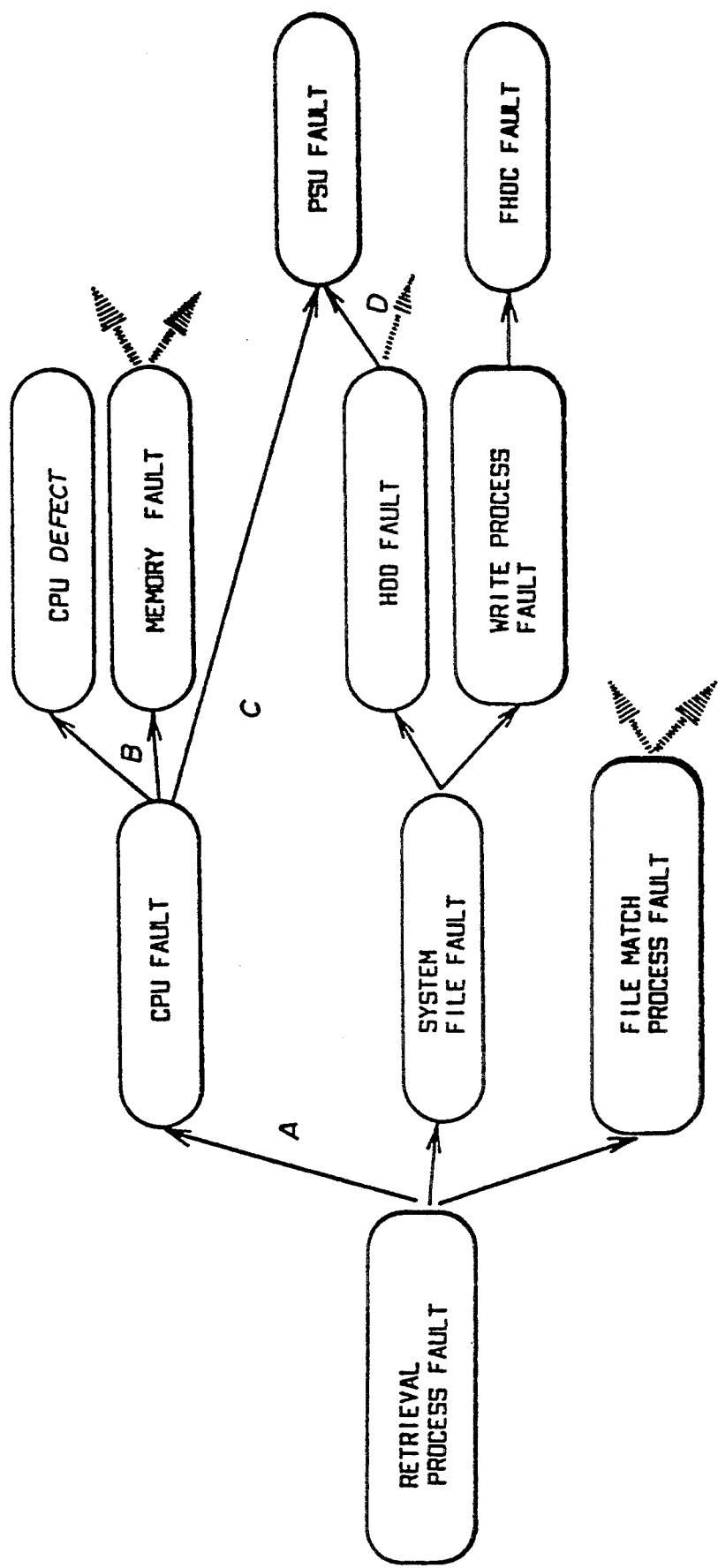
FIG. 17 is a diagram showing a causal relation tree describing a structure of faults occurring in a document retrieval process.

Next, a detailed description will be given of the generalization procedure performed by the knowledge base generating system according to the present invention. FIG. 17 shows a causal relation tree concerning fault events of a document retrieval process of a computer aided system. In the causal relation tree shown in FIG. 17, each causal relation of fault events in the document retrieval process is indicated by an arrow in FIG. 17, and each fault event of the causal relation which is the cause of the other fault event thereof is pointed to by the arrow in FIG. 17. Each fault event has a member of the computer aided system which corresponds to the device or process in which the fault event takes place.

In the causal relation tree shown in FIG. 17, the computer aided system includes a CPU (central processing unit), a HDD (hard disk drive), a PSU (power supply unit), a FHDC (floppy/hard disk drive controller), and a memory provided in the CPU. The document retrieval process includes a plurality of sub-processes such as a file matching process and a write process. These sub-processes are controlled by the CPU in accordance with system files stored in the HDD. The FHDC is a controller for writing data on the HDD and for reading data from the HDD. The PSU unit supplies electric power to each of the component units of the component aided system so that each component unit is driven.

Figure 18:
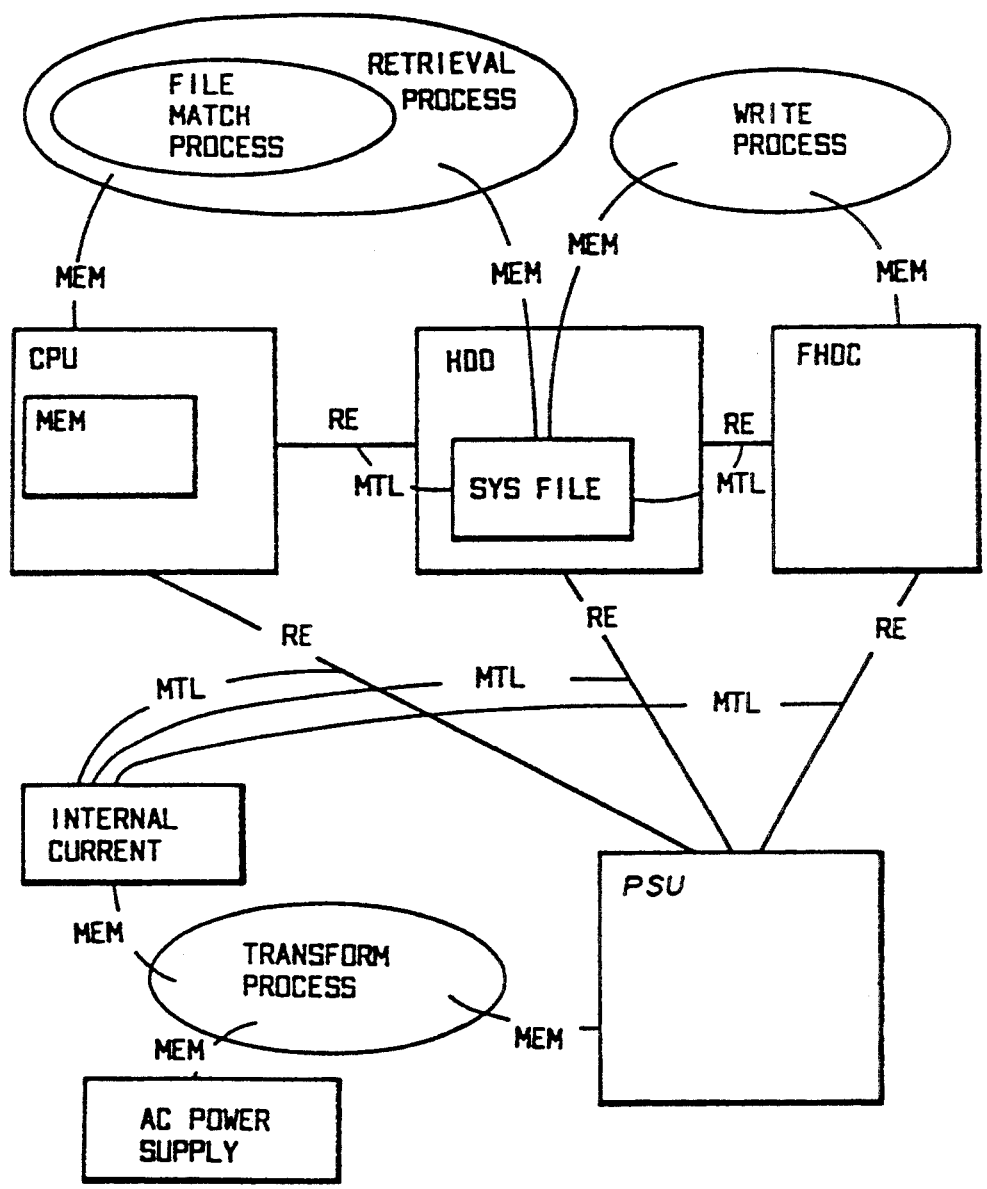
FIG. 18 is a diagram showing a relationship between members of a computer system in which a retrieval process is performed.

FIG. 18 shows the relationship between the members in the computer aided system which is the target machine. In the relationship shown in FIG. 18, an ellipse indicates a process member of the target machine, and a rectangle indicates a device member thereof. In the relationship shown in FIG. 18, one member is included in another member, which indicates a PART-OF relation between the two members in which the former member is a part of the latter member. A straight line of "relation" denotes a relation between the members (the device or process members). A curved line of "material" denotes a material relationship between the relation and the member, and a curved line of "membership" denotes a relationship between the members.

Figure 19:
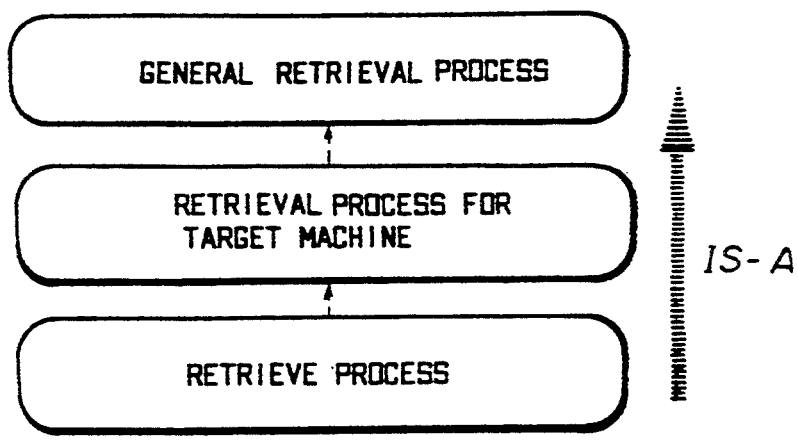
FIG. 19 is a diagram showing a hierarchical structure of the retrieval process used when generalizing causal relation knowledge of a fault of a high-rank member of the retrieval process.

Next, a description will be given of a first generalization procedure wherein a causal relation "A" between a retrieval process fault and a CPU fault shown in FIG. 17 is generated. This causal relation "A" indicates that the cause of the retrieval process fault is the CPU fault. The retrieval process has the hierarchical structure as shown in FIG. 19. In this causal relation "A" shown in FIG. 17, the "retrieval process fault" is the effect event, and the "CPU fault" is the cause event. When it is necessary to generate causal relation knowledge indicating that the cause of the fault of the target machine's retrieval process (the high-rank member of the retrieval process) is probably the CPU fault, generalization is performed with respect to the retrieval process fault, so that a concise, appropriate causal relation data is generated from the rules in the above TABLE as the causal relation knowledge of the high-rank member.

The retrieval process and the CPU, as shown in FIG. 18, have a restraint indicating that the CPU is a member of the retrieval process (the retrieval process has the other member of the HDD). In the second embodiment of the knowledge base generating system, a concise, appropriate rule is selected from the causal relation rules in the above TABLE, which rule satisfies the above restraint. In the first generalization procedure, the A-1 rule is selected from the TABLE, and generalization is performed so that a concise, appropriate causal relation data is generated as the causal relation knowledge of the high-rank member of the retrieval process.

Figure 20:
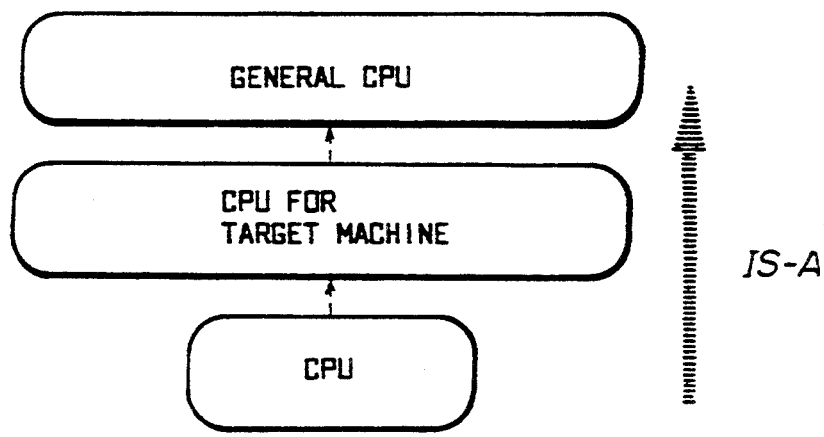
FIG. 20 is a diagram showing a hierarchical structure of CPU used when generalizing causal relation knowledge of a fault of a high-rank member of the CPU.

A second generalization procedure wherein a causal relation "B" between the CPU fault and the memory fault shown in FIG. 17 is generated will be described. This causal relation "B" indicates that the cause of the CPU fault is the memory fault. The CPU has the hierarchical structure as shown in FIG. 20. In the relation "B" shown in FIG. 17, the "CPU fault" is the effect fault event, and the "memory fault" is the cause fault event. When it is necessary to generate causal relation knowledge indicating that the cause of a fault of the target machine's CPU (the high-rank member of the CPU) is probably the memory fault, a generalization is performed with respect to the CPU, so that a concise, appropriate causal relation data is generated from the rules of the TABLE as the causal relation knowledge of the high-rank member.

The CPU and the memory, as shown in FIG. 18, have a restraint indicating that the memory is a PART-OF member of the CPU. In the third generalization procedure, the B-2 rule is selected from the TABLE, and generalization is performed so that a concise, appropriate causal relation data is generated as the causal relation knowledge of the high-rank member of the CPU.

A third generalization procedure wherein a causal relation "C" between the CPU fault and the PSU fault shown in FIG. 17 is generalized will now be described.

This causal relation "C" indicates that the cause of the CPU fault is the PSU fault. The CPU has the hierarchical structure as shown in FIG. 20. In the relation "C" shown in FIG. 17, the "CPU fault" is the effect fault event, and the "PSU fault" is the cause fault event. When it is necessary to generate causal relation knowledge indicating that the cause of a fault of the target machine's CPU (the high-rank member of the CPU) is probably the PSU fault, the generalization is performed with respect to the CPU, so that a concise, appropriate causal relation data is generated from the rules of the TABLE as the causal relation knowledge of the high-rank member.

The CPU and the PSU, as shown in FIG. 18, have a restraint in which the CPU and the PSU are related to each other through an intermediate material of the internal current. In the third generalization procedure, the B-3, C-2 and A-1 rules are selected from the TABLE, and generalization is performed so that concise, appropriate causal relation data is stored as the causal relation knowledge of the high-rank member of the CPU. In this procedure, the intermediate material of the internal current is stored along with the above mentioned causal relation knowledge.

Figure 21:
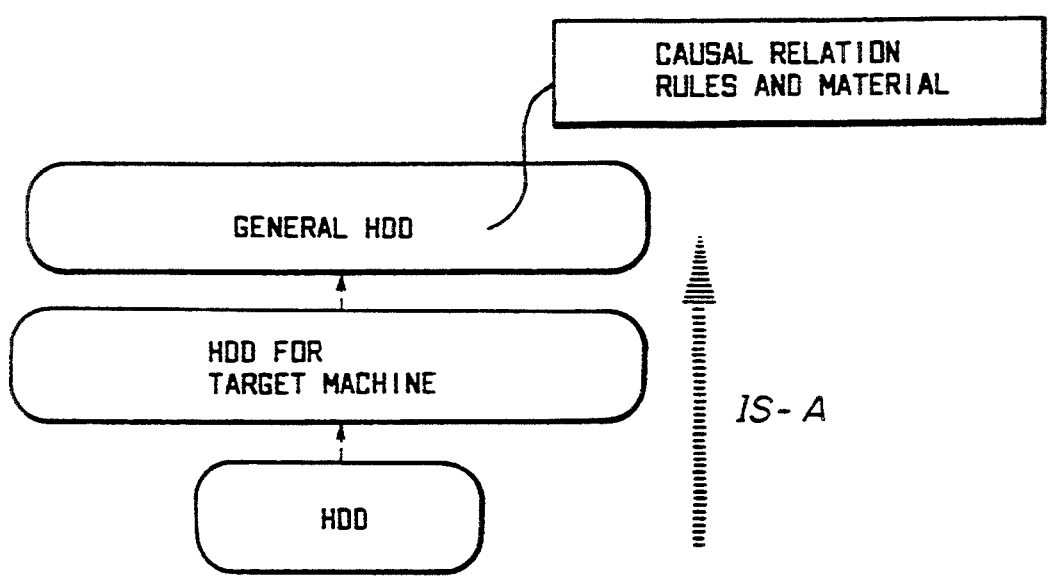
FIG. 21 is a diagram showing a hierarchical structure of HDD for generalizing causal relation knowledge of a fault of a high-rank member of the HDD.

Next, a fourth generalization procedure wherein a new, general causal relation is generated by using the preset causal relation rules and the structure of the target machine will be described. For the sake of convenience, the following description is given as an example of how a new, general causal relation "D" with respect to the HDD fault shown in FIG.17 is generated. The HDD has the hierarchical structure (IS-A relations) as shown in FIG. 21. It is assumed that the causal relation rules B-3, C-2 and A-1 along with the internal current as the intermediate material are stored with respect to the highest-rank member "general HDD" as shown in FIG. 21.

In the fourth generalization procedure, the membership of the HDD fault is the HDD. All the causal relation rules and the intermediate material for the "general HDD" (the highest-rank member) are assigned to the HDD. Thus, in accordance with the structure of the target machine and the causal relation rule B-3, two causal relations R1 and R2 shown in FIG. 22 are first derived as candidates of general causal relations. However, because the restraint indicating that the intermediate material is the internal current exists, only the causal relation R2 remains as the candidate.

In accordance with the causal relation R2, the cause of the defective internal current is next searched for. In view of the structure of the target machine and the causal relation rule C-2, a causal relation R3 is derived as a secondary candidate. In a similar manner, in accordance with the causal relation R3 and the causal relation rule A-i, a causal relation R4 is derived as the subsequent candidate, in view of the structure of the target machine. Consequently, it is possible to derive a causal relation R5, as shown in FIG. 22, which indicates that the cause of the HDD fault is probably the PSU fault.

When the embodying procedure is performed, the embodying of causal relation knowledge sets can be accomplished if a corresponding member of the target machine exists and a corresponding restraint is satisfied.

Figure 23A:
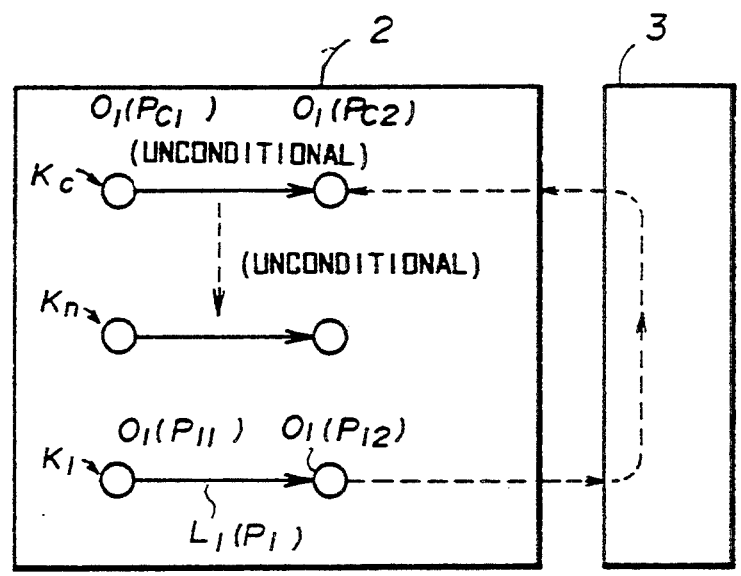
FIG. 23A and 23B are diagrams for explaining the operations performed by the first and second embodiments of the knowledge base generating systems of the present invention.
Figure 23B:
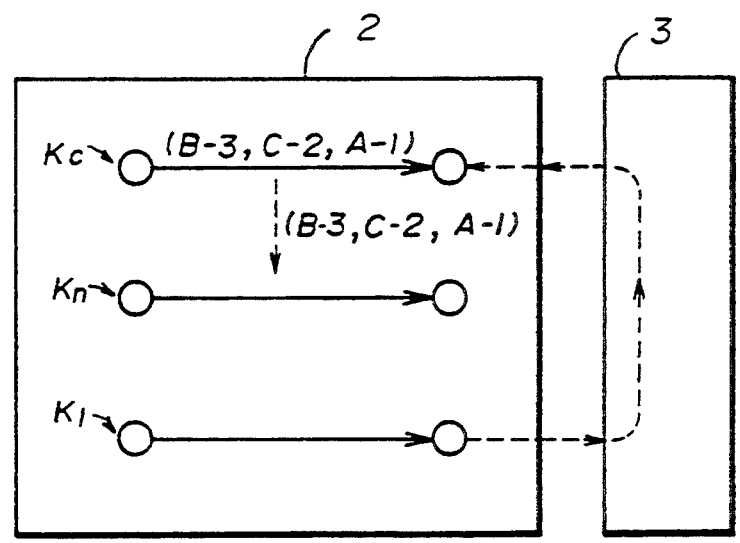

Next, a comparative analysis is made between the operation performed by the first embodiment of the present invention and the operation performed by the second embodiment, with reference to FIGS. 23A and 23B.

In the first embodiment, as shown in FIG. 23A, a causal relation knowledge set K1 is generated in the causal model base 21. This causal relation knowledge set K1 is described by a cause fault event O1(P11) and an effect fault event O1(P12) which are linked by a causal relation L1(P1). A common causal relation knowledge set Kc is generated by using the causal relation knowledge set K1 in accordance with the device knowledge only. In other words, the common causal relation knowledge set Kc is generated without using any restraint or limitation. The relationship between a cause fault object O1(Pc1) and an effect fault object O1(PC2) in the common causal relation knowledge set Kc has no restraint with respect to the relationship between the cause and effect objects O1(P1) and O1(P2) in the causal relation knowledge set K1. Thus, the common causal relation knowledge set Kc is similar to the knowledge set K1. In the example shown in FIG. 23A, a causal relation knowledge set Kn is generated from the common causal relation knowledge set Kc through the embodying procedure. However, it is difficult to correctly generate a common cause-effect relation if the target machine has a device structure different from that of the existing device knowledge of the device model base.

In the second embodiment, as shown in FIG. 23B, a causal relation knowledge set K1 is generated in the causal model base 21. This causal relation knowledge set K1 is described by a cause fault event and an effect fault event which are linked by a causal relation. A general causal relation knowledge set Kc is generated by using the causal relation knowledge set K1, in accordance with the device knowledge as well as the process knowledge. Generally, the relationship between a cause fault object O1(Pc1) and an effect fault object O1(Pc2) in the general causal relation knowledge set Kc has several restraints with respect to the relationship between the cause and effect objects in the causal relation knowledge set K1. Thus, the general causal relation knowledge set Kc is generated in accordance with the restraints. Also, a dependent causal relation knowledge set Kn is generated, only when the restraints are satisfied, by using the general causal relation knowledge set Kc through the embodying procedure. Thus, it is possible to correctly generate common causal relations even when the target machine has a device structure which is different from that of the existing device knowledge of the device model base because the cause-effect relation knowledge is derived in view of the general causal relation knowledge sets, each of which includes one or more restraints to be satisfied.

Further, the present invention is not limited to the above described embodiments, and variations and modifications may be made without departing from the scope of the present invention.

What is claimed is

1. A system for generating a knowledge base for use in a knowledge based expert system, said system comprising:
a knowledge base comprising a first knowledge base containing sets of first causal relation knowledge describing cause-effect relations of events taking place within a target machine, and comprising a second knowledge base containing sets of membership knowledge describing relations between machine members of the target machine, each of said sets describing an event contained in the first knowledge base, comprising data that identifies at least one of the machine members of the target machine contained in the second knowledge base, and said first knowledge base and said second knowledge base comprising mutually retrievable data;

retrieval means for retrieving a number of first machine members contained in the second knowledge base based on the membership knowledge of the second knowledge base, said first machine members corresponding to similar first causal relation knowledge sets within the first knowledge base;

first detection means for detecting whether or not said second knowledge base contains a high-rank member, said high-rank member corresponding to each of the first machine members retrieved by said retrieval means; and a commonizing means for generating a common causal relation knowledge set in the first knowledge base when it is detected that the second knowledge base contains a high-rank member, said common causal relation knowledge set corresponding to the high-rank member of said second knowledge base and describing a set of events linked by a cause-effect relation.

2. A system according to claim 1, wherein said second knowledge base comprises a device model base containing sets of device knowledge describing relations between machine devices of the target machine, each of said sets of causal relation knowledge contained in the first knowledge base comprising a set of two machine members linked by a cause-effect relation, each of said two machine members comprising a device name used to retrieve one of the machine devices contained in the device model base.

3. A system according to claim 1, wherein said second knowledge base comprises a device model base containing sets of device knowledge describing relations between machine devices of the target machine, and a process model base containing sets of process knowledge describing relations between machine processes of the target machine, and wherein each set of causal relation knowledge contained in the first knowledge base comprises a set of two machine members linked by a cause-effect relation, each set of device knowledge contained in the device model base comprises a set of two machine devices linked by a device-to-device relation, each set of process knowledge contained in the process model base comprises a set of two machine processes linked by a process-to-process relation, and each of the first knowledge base, the device model base and the process model base contains knowledge data linking a member of one knowledge base to a member of another knowledge base.

4. A system according to claim 1, further comprising:
second detection means for detecting whether or not said second knowledge base contains low-rank members which are dependent on the high-rank member and different from the first machine members of the second knowledge base; and embodying means for generating sets of second causal relation knowledge in the first knowledge base by using the common causal relation knowledge set when it is detected that the second knowledge base contains low-rank members, said second causal relation knowledge sets corresponding to the low-rank members detected to be contained by said second detection means and being different from the first causal relation knowledge sets.

5. A system according to claim 4, wherein said embodying means generates the sets of second causal relation knowledge by copying data contained in the common causal relation knowledge set in the first knowledge base.

6. A system according to claim 5, wherein, when a restraint is stored in the first knowledge base together with the common causal relation knowledge set, said embodying means generates said second causal relation knowledge sets in the first knowledge base only when the restraint is satisfied.

7. A system according to claim 6, wherein said restraint is one of a number of preset causal relation rules describing general causal relations of events in a general structure including the target machine, and said preset causal relation rules being determined in accordance with the membership knowledge sets contained in the second knowledge base.

8. A system according to claim 6, wherein said embodying means generates said second causal relation knowledge sets in the first knowledge base by copying data contained in the common knowledge set in the first knowledge base.

9. A system according to claim 1, further comprising:
causal relation rules means for presetting a number of causal relation rules describing general causal relations of events in a general structure including the target machine, in accordance with the membership knowledge sets contained in the second knowledge base; and
condition setting means for setting at least one of the causal relation rules as a restraint corresponding to the high-rank member of the second knowledge base,
wherein, when it is detected that the high-rank member is contained in the first knowledge base and the common causal relation knowledge set is generated in the first knowledge base, said commonizing means stores said restraint in the first knowledge base together with the common causal relation knowledge set.

10. A system according to claim 9, wherein said second knowledge base comprises a device model base containing sets of device knowledge describing relations between machine devices of the target machine and a process model base containing sets of process knowledge describing relations between machine processes of the target machine, and
wherein, when the common causal relation knowledge set is generated in the first knowledge base, said condition setting means sets one of the causal relation rules as a restraint corresponding to a high-rank device member of the device model base and/or a restraint corresponding to a high-rank process member of the process model base.

11. A system according to claim 9, wherein said commonizing means generates a common causal relation knowledge set in the first knowledge base by using said causal relation rules provided by said causal relation rules means.

12. A computer implemented method for generating a knowledge base for use in a knowledge based expert system, said method comprising the steps of:
providing a knowledge base comprising a first knowledge base containing sets of first causal relation knowledge describing cause-effect relations of events taking place within a target machine, and a second knowledge base containing sets of membership knowledge describing relations between machine members of the target machine, each of said events describing an event contained in the first knowledge base comprising data that identifies at least one of the machine members of the target machine contained in the second knowledge base, and said first knowledge base and said second knowledge base comprising mutually retrievable data;
retrieving a number of first machine members contained in the second knowledge base based on the membership knowledge of the second knowledge base, said first machine members corresponding to similar first causal relation knowledge sets within the first knowledge base;
detecting whether or not said second knowledge base contains a high-rank member, said high-rank member corresponding to each of the first machine members retrieved by said retriever; and
generating a common causal relation knowledge set in the first knowledge base when it is detected that the second knowledge base contains a high-rank member, said common causal relation knowledge set corresponding to the high-rank member of the second knowledge base and describing a set of events linked by a cause-effect relation.

* * * * *